Figure 1:
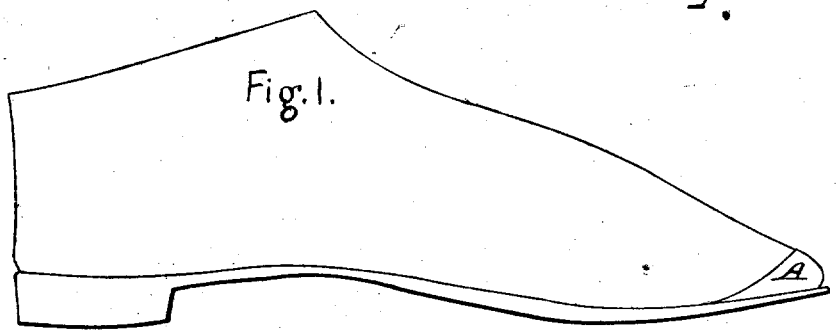

N. Silverthorn.

Shoe Tip.

No 1,339.

Reissued Sept. 2. 1862.

Witnesses:

C. F. Wilson

A. D. Snyder

Inventor:

Nurman Silverthorn

UNITED STATES PATENT OFFICE.

JAMES M. ALLEN, ASSIGNEE, BY MESNE ASSIGNMENTS, OF NEWMAN SILVERTHORN, OF PRESCOTT, WISCONSIN.

IMPROVED BOOT AND SHOE TIP.

Specification forming part of Letters Patent No. 26,329, dated November 29, 1859; Reissue No. 1,339, dated September 2, 1862.

*To all whom it may concern:*

Be it known that NEWMAN SILVERTHORN, of Prescott, in the county of Pierce and State of Wisconsin, has invented or discovered a new article of manufacture—viz., a tip applicable to boots and shoes, for the protection of the toe part of the same; and I do hereby declare the following to be a full, clear, and exact description of the same, reference being had to the accompanying drawings.

In boots and shoes, particularly those designed for children's wear and for the wear of farm laborers or other persons whose occupation requires them often to walk over soil growing certain grasses whose blades are stiff and cutting—as those of most of the Western prairies—it has been found necessary to protect the toe portion of the boot or shoe by means of a tip made of leather, metal, india-rubber, or other substance capable of resisting wear in a more or less perfect manner. Those had been made either together with and while making the boot or shoe to which they were applied, and in which case the tip was generally cut of leather, fitted and sewed to the upper prior to its being fastened to the sole—an operation both difficult and expensive, and consequently impracticable for manufacturing purposes—or as a separate and distinct device, in which case it was used as a protecting cap over the toe end of both the upper and sole of the boot or shoe, without being permanently fixed or secured thereto, or so as to constitute an inseparable part of the boot or shoe—whereby it was liable to be lost, besides being expensive on account of the means necessary to secure it to the boot.

The object of this invention is to avoid the objection above referred to, and to produce a tip formed of suitable material, and shaped in such a manner that it can readily be applied to the boot or shoe in a permanent manner, without loss of time and without necessitating a separate operation. Such tip, making a neat finish, and being more durable than leather or other articles of which shoes are ordinarily made, protects that part of the shoe that is most liable to be worn out, and altogether makes a better and cheaper shoe than any heretofore known with tips upon them.

And this invention consists in the production, as an article of manufacture, of a tip formed into shape in such a manner as to allow of its being applied and fastened to the toe part of shoes or boots by sewing or pegging it between the upper and the sole, substantially as hereinafter described, and for the purposes set forth.

And this invention further consists in the production of a shoe or boot tip as an independent device and a marketable commodity, formed of a material different from, and that will present greater durability and resistance to wear than, that of which the shoe or boot to which it is intended to be applied is made, such tip being made of such permanent form as to lap over and under the toe part of the upper, and whereby it may be attached to the boot or shoe by securing it at its base between the sole and upper, and without sewing it to the upper, substantially as hereinafter described.

And this invention further consists in the production, as an article of manufacture, of a shoe or boot tip made of such india-rubber or gutta-percha compound as that when vulcanized it shall be of a more or less soft and flexible elastic nature, or of any other material that will render it applicable to boots and shoes, by sewing it between the upper and the sole, substantially as hereinafter set forth.

And this invention further consists in the production, as an article of manufacture, of a shoe or boot tip, made of such india-rubber or gutta-percha compound as that when vulcanized it shall be of a more or less hard or rigid nature, or of any other material that will render it applicable to boots or shoes by pegging it between the upper and the sole, substantially as hereinafter described.

To enable others skilled in the art to make and use this invention, I shall now proceed to describe it particularly, and the manner in which the same is or may be carried into effect, referring to the accompanying drawings, in which—

Figure 2:
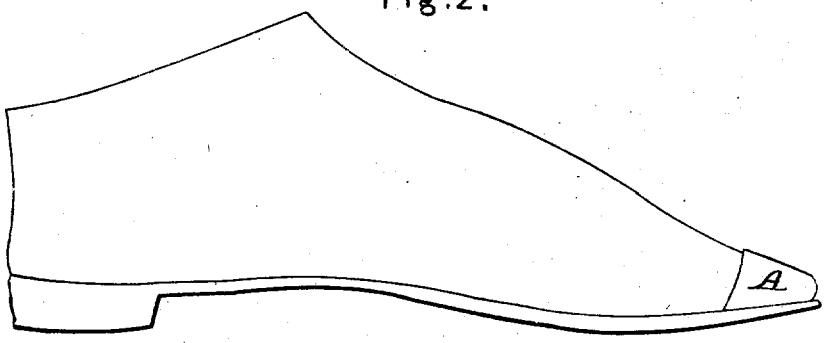
Figure 3:
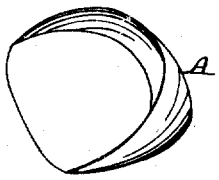
Figure 4:
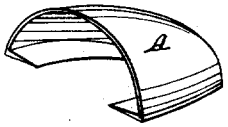

Figures 1 and 2 represent shoes with the tips upon them, and Figs. 3 and 4 tips separate from shoes.

As no claim is laid to the peculiar mode or manner of producing the tip, and which must necessarily vary according to the nature of the material it is made of, and which is well known to those acquainted with special arts of working metal, india-rubber, &c., I shall confine myself to the description of that part of the invention which is new, and whereby it may be distinguished from all other inventions.

These tips, marked A in the drawings, are generally of the form of the toe part of the shoe, so as to conjoin with it, its upper edge being rounded off in the crescent fashion, or to bulge out in the middle, or formed square or otherwise, so as to produce a symmetrical and pleasing appearance to the shoe when applied. The tip thus formed is provided with a base-plate or flange connected with or made in one piece with the tip. The base need not extend throughout the whole length or width of the sole, as a mere flange sufficiently wide to come within the row of stitches or pegs, whereby it is secured together with the upper to the sole, being quite sufficient. It will be obvious that such tips, if made of metal, may be struck off or up by means of the ordinary bed and die devices, and if made of rubber or gutta-percha, they may be formed before vulcanization—*i. e.*, when still in plastic condition—upon molds, and may be cured or vulcanized afterward.

The mode of applying the tips to boots and shoes may be as follows: The boot or shoe is first "lasted;" the outer sole is then applied and sewed or pegged to the upper, leaving the toe portion disunited for the placing of the tip, by inserting its base between the upper and the sole. The three—viz: the upper, tip-base, and sole—are then sewed together or pegged together, as the case may be. For some kind of pegged work I prefer to use tips made of hard rubber, metal, or some other substance which affords greater strength and durability than leather or other substance of which the shoe or boot to which the tip is to be applied is made, and which can be readily fashioned into requisite and permanent shape. The hard-rubber or metal tip, however, is mainly applicable to pegged work—*i. e.*, to boots or shoes in which the sole is united to the upper by means of pegs or nails—and is not suitable for practicable purposes for sewed work. This objection does not apply to tips made of an india-rubber or gutta-percha compound that when vulcanized is soft and flexible. Such tips, besides being easily made and fashioned into an unalterable form, are softer to the toe, impervious to dampness, and may be securely held by stitching them to their place in boots or shoes which have their soles united to the uppers by sewing.

Another and important advantage of the soft and elastic india rubber tip over all others is, that dirt, dust, and mud, that usually gather and fill the space between the tip and the toe, may be easily removed by simply turning the tip over, the elasticity of the material bringing it back to its original position. By this means the toe is kept clean and prevented from rotting.

Having thus described my invention, I would observe that I do not confine the invention to the particular material of which the tip is or may be made; nor yet to the manner or process by which the same is or may be produced; but

What is claimed as the invention of the said NEWMAN SILVERTHORN is—

1. A tip, as an article of manufacture, formed into shape in such a manner as to allow of its being applied and fastened to the toe part of shoes or boots by sewing or pegging it between the upper and the sole, substantially as hereinbefore described, and for the purposes set forth.

2. A shoe or boot tip, as an independent device and marketable commodity, formed of a material different from and that will present greater durability and resistance to wear than that of which the shoe or boot to which it is intended to be applied is made, such tip being made of such permanent form as to lap over and under the toe part of the upper, and whereby it may be attached to the boot or shoe by securing it at its base between the sole and upper and without sewing it to the upper, substantially as herein described.

3. The production, as an article of manufacture, of a shoe or boot tip made of such india-rubber or gutta-percha compound as that, when vulcanized, it shall be of a more or less soft, flexible, and elastic nature, or of any other material that will render it applicable to boots or shoes by sewing it in between the upper and the sole, substantially as herein set forth.

4. The production, as an article of manufacture, of a shoe or boot tip made of such india-rubber or gutta-percha compound as that, when vulcanized, it shall be of a more or less hard or rigid nature, or of any other material that will render it applicable to boots or shoes by pegging it in between the upper and the sole, substantially as herein set forth.

JAMES M. ALLEN.

Witnesses:
A. POLLAK,
C. L. HUGHES.